United States Patent [19]

Schneider et al.

[11] 4,290,942
[45] Sep. 22, 1981

[54] HEAT-STABILIZED CHLORINE-CONTAINING THERMOPLASTIC

[75] Inventors: Rainer Schneider, Bensheim-Auerbach; Gerd Abeler, Griesheim über Darmstadt, both of Fed. Rep. of Germany

[73] Assignee: Ciba-Geigy Corporation, Ardsley, N.Y.

[21] Appl. No.: 108,858

[22] Filed: Dec. 31, 1979

Related U.S. Application Data

[63] Continuation of Ser. No. 941,822, Sep. 11, 1978, abandoned.

[30] Foreign Application Priority Data

Sep. 30, 1977 [CH] Switzerland .................. 11983/77

[51] Int. Cl.³ .................................... C08K 5/37
[52] U.S. Cl. .................... 260/45.85 H; 260/23 X; 260/45.7 PH; 260/45.7 S; 260/45.85 S; 260/45.95 G
[58] Field of Search ............ 260/45.7 S, 45.95 G, 260/45.85 H, 45.85 S, 23 XA

[56] References Cited

U.S. PATENT DOCUMENTS

| | | | |
|---|---|---|---|
| 2,564,194 | 8/1951 | deNie et al. | 260/45.8 A |
| 2,671,064 | 3/1954 | Cowell et al. | 260/23 XA |
| 3,004,949 | 10/1961 | Chevassus | 260/45.7 S |
| 3,144,422 | 8/1964 | Homberg | 260/45.7 S |
| 3,242,133 | 3/1966 | Lindsey | 260/45.7 S |
| 4,098,763 | 7/1978 | Starnes, Jr. | 260/45.7 S |
| 4,111,873 | 9/1978 | Cordes | 260/45.7 S |

FOREIGN PATENT DOCUMENTS

| | | |
|---|---|---|
| 1122507 | 1/1962 | Fed. Rep. of Germany. |
| 1494941 | 12/1969 | Fed. Rep. of Germany. |
| 2648701 | 5/1977 | Fed. Rep. of Germany. |

OTHER PUBLICATIONS

Luettringhaus et al., Chem. Abs., vol. 68, 1968, 87282u.

Primary Examiner—Howard E. Schain
Assistant Examiner—R. A. White
Attorney, Agent, or Firm—Harry Falber

[57] ABSTRACT

Chlorine-containing thermoplastics, especially polyvinyl chloride, can be stabilized against thermal degradation by incorporating therein synergistic mixtures consisting of (a) a mercaptan of the formula $R(CH_2SH)_2$, wherein n is 2 to 4 and R represents a n-valent aromatic radical, and (b) an epoxidized plasticizer.

1 Claim, No Drawings

HEAT-STABILIZED CHLORINE-CONTAINING THERMOPLASTIC

This is a continuation of application Ser. No. 941,822, filed on Sept. 11, 1978, now abandoned.

The present invention relates to chlorine-containing thermoplastics which are heat-stabilised with a mixture of a mercaptomethyl aromatic and an epoxy plasticiser.

Polyvinyl chloride tends to become degraded under the influence of heat, so that it is necessary to add suitable stabilisers in order to make processing possible at elevated temperature without or, as the case may be, with only insignificant changes in the physico-mechanical properties and discolouration of the material.

In addition to chiefly metal-containing stabilisers, a number of metal-free stabilisers have also become known, which do not however always satisfy the multiplicity of technical requirements. Among the most valuable metal-free stabilisers are the sulfur-containing $\beta$-amino-crotonic acid esters which are described in German patent specification No. 1,544,768. They are very effective, but in some cases the relatively low thermal stability is held to be a drawback, as unpleasant odours can occur as a result of the formation of fission products.

Stabilisers which contain mercapto groups have also been proposed, for example esters of polyols, such as pentaerythritol, and of mercaptocarboxylic acids, such as thioacetic acid, which can also be used together with epoxidised soy bean oil. These stabilisers, described in U.S. Pat. No. 3,144,422, have however an unpleasant odour and their effectiveness is often insufficient, which limits their use in practice.

Aromatic mercaptans, such as di(mercaptomethyl)-benzene, have already been proposed as crosslinking agents for chlorine-containing thermoplastics in U.S. Pat. No. 2,598,407, but without any mention being made therein of the problem of heat stabilising.

It is the object of the present invention to provide a chlorine-containing thermoplastic which is heat-stabilised with metal-free compounds and which does not have the above-mentioned disadvantages.

Accordingly, the present invention provides a heat-stabilised, chlorine-containing thermoplastic which contains a mercaptan and an epoxidised plasticiser as co-stabiliser, wherein said mercaptan has the formula I

$$R-(CH_2-SH)_n \qquad (I)$$

wherein n is an integer from 2 to 4 and R represents a divalent to quadrivalent substituted or unsubstituted benzene or naphthalene group, or a divalent to quadrivalent group of the formula II $$Ar-X-Ar \qquad (II)$$

wherein Ar represents an unsubstituted or substituted phenyl group which carries the free valencies, and X represents a direct bond, alkylidene or cycloalkylidene, O, S, SO or $SO_2$.

The mercaptans of the formula I can be mercaptomethylated benzene derivatives wherein the benzene group can also contain other substituents, for example alkyl and alkoxy groups of 1 to 18, preferably 1 to 12 and especially 1 to 6, carbon atoms, or alkoxycarbonyl groups of 2 to 18, preferably 1 to 12 and especially 1 to 6, carbon atoms, or alkoxycarbonyl groups of 2 to 18, preferably 2 to 12 and especially 2 to 6, carbon atoms.

The benzene group can contain up to 4 of these substituents.

The mercaptans can also be mercapto-methylated naphthalene or diphenyl derivatives which can contain further substituents, in particular those mentioned above in respect of the benzene group. Here too, preferably not more than four of these substituents are present.

In the group of the formula II, X is preferably a direct bond. If X represents alkylene, it can contain 1 to 6, preferably 1 or 2, carbon atoms, and can be substituted by phenyl groups. X can also be alkylidene or cycloalkylidene containing 1 to 8 or 5 to 8 ring carbon atoms respectively. Examples of X are: methylene, ethylene, 1,2- or 1,3-propylene, 1,4-butylene, hexylene, diphenylmethylene, methylphenylmethylene, phenylmethylene, ethylidene, 1,1- or 2,2-propylidene, butylidene, hexylidene, octylidene, cyclopentylidene, cyclohexylidene, cyclooctylidene.

A number of examples of preferred compounds of the formula I are: o-, m- or p-di(mercaptomethyl)benzene, 1,3,5-trimethyltri(mercaptomethyl)benzene, 2,3,5,6-tetramethyldi(mercaptomethyl)benzene, di(mercaptomethyl)naphthalene and, in particular, 4,4'-di(mercaptomethyl)diphenyl.

Some of the mercaptans of the formula I are known or can be obtained by methods known in the art, for example by reaction of compounds of the formula $R(CH_2Cl)_n$ with thiourea to give the thiuronium salts, which are hydrolysed with, for example, $NaOH/H_2O$, to yield the desired mercaptans.

The mercaptans of the formula I are incorporated in the chlorine-containing thermoplastics, before processing in conventional machines, usually in amounts of 0.01 to 5, preferably 0.1 to 3, percent by weight, based on the weight of the thermoplastics. By themselves they have a stabilising action, which does not however suffice in actual practice. Surprisingly, however, when the mercaptans of the formula I are used together with epoxidised plasticisers, a synergistic action has been found, which makes their use possible in actual practice.

The plasticisers can be used in the amounts which are necessary for adjusting desired properties in plasticised chlorine-containing thermoplastics. When used only as co-stabiliser, they are employed usually in amounts of at least 0.01% by weight, preferably 0.01 to 10 and especially 0.1 to 5% by weight, based on the weight of the chlorine-containing thermoplastics. It is advantageous to employ the mercaptan and the epoxidised plasticiser in a ratio of about 1:0.5 to 1:5, preferably 1:1 to 1:4.

Preferred epoxidised plasticisers are the esters of acids having olefinic unsaturation with monofunctional or polyfunctional alcohols and the double bonds of which have been epoxidised. The acids contain preferably 12 to 22 carbon atoms, and the alcohols 1 to 30, especially 1 to 20, carbon atoms. Preferred acids are in particular oleic acid, and also elaidic acid or linoleic acid. Examples are epoxidised butyl or octyl aleate, but especially epoxidised soy bean oil. Such epoxy compounds are commercially available as technical plasticisers for polyvinyl chloride and are known to the person skilled in the art.

Suitable chlorine-containing thermoplastics are in particular homopolymers or copolymers of vinyl chloride. Suspension and mass polymers, and emulsion polymers having a low content of emulsifier, are preferred. Examples of suitable comonomers for the copolymers are: vinylidene chloride, trans-dichloroethene, ethylene, propylene, butylene, maleic acid, acrylic acid, fumaric acid, itaconic acid. Further suitable polymers are post-chlorinated polyolefins. The heat-stabilising of rigid or plasticised polyvinyl chloride is a particularly preferred utility.

The thermoplastics of the present invention are obtained by known methods by incorporating the stabilisers and, if desired, further stabilisers, in the polymer. A homogeneous mixture of stabiliser and polyvinyl chloride can be obtained, for example, using a two-roll mixer at 150° to 210° C. Depending on the end use of the moulding compound, further additives can also be incorporated before or simultaneously with the incorporation of the stabiliser. Examples of further additives are: lubricants, preferably montan waxes or glycerol esters, plasticisers, fillers, modifiers, such as impact strength additives, pigments, light stabilisers, UV absorbers, antioxidants or further co-stabilisers, for example phosphites. The thermoplastics of the invention can be processed to moulded articles by the conventional moulding methods, for example by extrusion, injection moulding or calendering.

The heat stabilising effect obtained with the metal-free stabilisers is outstanding in the thermoplastics of the invention and is at least comparable with or better than that of the known effective sulfur-containing aminocronates. The light stability is also outstanding. The mercaptans used according to the invention are virtually odourless, thermally stable and of low volatility, so that no adverse side-effects are observed during processing. It is regarded as particularly surprising that the combined action of the constituents produces an outstanding synergistic heat stabilising effect, although the individual action of the mercaptans employed is not very pronounced.

The invention is illustrated in more detail by the following Examples in which the parts and percentages are by weight.

EXAMPLE 1

Test of heat stability

A dry blend, consisting of 100 parts of S-PVC (K value 64), 20 parts of dioctyl phthalate, 4 parts of epoxidised soy bean oil (Reoplast 39), 0.5 part of phosphite stabiliser (Irgastab CH 300) and 1.5 parts of mercaptan, is rolled for 5 minutes at 170° C. on a mixer roll and then samples of sheet with a thickness of 0.3 mm are taken.

The samples are subjected to heat in an oven at 180° C. and every 15 minutes the thermal ageing of a sample is determined according to the Yellowness Index (YI) of ASTM D 1925-70. The results are reported in Table 1.

The same sheets without addition of the epoxidised soy bean oil and 2 parts of mercaptan were used as comparison. In this test too, the YI after ageing at 180° C. was determined. The values are reported in Table 2.

It is evident from Table 2 that, in spite of the increased amount of mercaptan, only a moderate stabilising action is obtained if no epoxide compound is used.

The synergism of the two stabiliser additives of the invention is expressed by the difference between Table 1 and Table 2. No synergism occurs on using the aminocronate employed concurrently for comparison purposes.

TABLE I

| Mercaptan | Yellowness Index after a thermal ageing of | | | | | | |
|---|---|---|---|---|---|---|---|
| | 0 | 15 min | 30 min | 45 min | 60 min | 75 min | 90 min |
| - (basic formulation) | 16 | 57 | >100 | | | | |
| thioethylene glycol bis-β-aminocrotonate | 6 | 21 | 44 | 80 | >100 | | |
| o-di(mercaptomethyl) benzene | 4 | 30 | 85 | >100 | | | |
| m-di(mercaptomethyl) benzene | 2 | 21 | 70 | >100 | | | |
| p-di(mercaptomethyl) benzene | 2 | 26 | 75 | >100 | | | |
| 4,4-di-(mercaptomethyl) diphenyl | 4 | 14 | 29 | 55 | 77 | 86 | >100 |
| 2,3,5,6-tetramethyl-di-(mercaptomethyl)benzene | 3 | 23 | 58 | 86 | >100 | | |
| 1,3,5-trimethyl-tri-(mercaptomethyl)benzene | 3 | 18 | 45 | 65 | 75 | >100 | |
| di(mercaptomethyl)naphthalene | 10 | 21 | 48 | 66 | 81 | >100 | |

TABLE II

| Mercaptan | Yellowness Index after ageing | | |
|---|---|---|---|
| | 0 | 15 min | 30 min |
| - (basic formulation) | 21 | >100 | |
| thioethylene glycol bis-β-aminocrotonate | 6 | 27 | 63 |
| o-di(mercaptomethyl) benzene | 5 | 63 | 100 |
| m-di(mercaptomethyl) benzene | 4 | 67 | >100 |
| 4,4'-di(mercaptomethyl) benzene | 4 | 66 | >100 |
| 2,3,5,6-tetramethyl-di-(mercaptomethyl)benzene | 7 | 81 | >100 |
| 1,3,5-trimethyl-tri-(mercaptomethyl)benzene | 6 | 52 | 96 |
| di(mercaptomethyl)-naphthalene | 5 | 41 | 91 |

What is claimed is:

1. A method for stabilizing chlorine-containing thermoplastics, which comprises incorporating into said thermoplastic a stabilizing amount of an epoxidised plasticizer, a phosphite, and a mercaptan of the formula (I)

$$R-(CH_2-SH)_n \qquad (I)$$

wherein n is an integer from 2 to 4 and R represents a divalent to quadrivalent benzene or naphthalene, benzene or naphthalene substituted with alkyl of 1 to 18 carbon atoms, alkoxy of 1 to 18 carbon atoms, or alkoxycarbonyl of 2 to 18 carbon atoms, or a divalent to quadrivalent group of the formula II $$-Ar-X-Ar- \qquad (II)$$

wherein Ar represents an phenyl group, unsubstituted or substituted with alkyl of 1 to 18 carbon atoms, alkoxy of 1 to 18 carbon atoms, or alkoxycarbonyl of 12 to 18 carbon atoms, which carries the free valencies, and X represents a direct bond, alkylene, alkylidene or cycloaklylidene, O, S, SO or $SO_2$.

* * * * *